United States Patent
Hunt (10) Patent No.: US 10,696,190 B2
(45) Date of Patent: Jun. 30, 2020

(54) VEHICLE SEAT

(71) Applicant: JAGUAR LAND ROVER LIMITED, Coventry, Warwickshire (GB)

(72) Inventor: Graham Hunt, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 186 days.

(21) Appl. No.: 16/018,474

(22) Filed: Jun. 26, 2018

(65) Prior Publication Data

US 2019/0039480 A1    Feb. 7, 2019

(51) Int. Cl.
| | |
|---|---|
| *B60N 2/02* | (2006.01) |
| *B60R 21/015* | (2006.01) |
| *B60N 2/00* | (2006.01) |
| *B60N 2/50* | (2006.01) |
| *B60N 2/54* | (2006.01) |

(52) U.S. Cl.
CPC ............ *B60N 2/0284* (2013.01); *B60N 2/002* (2013.01); *B60N 2/502* (2013.01); *B60N 2/544* (2013.01); *B60R 21/01522* (2014.10)

(58) Field of Classification Search
CPC ...... B60N 2/0284; B60N 2/002; B60N 2/502; B60N 2/544; B60R 21/01522
USPC ..................................................... 297/284.11
See application file for complete search history.

(56) References Cited

U.S. PATENT DOCUMENTS

| | | | |
|---|---|---|---|
| 2008/0174162 A1 | 7/2008 | Becker et al. | |
| 2012/0166046 A1 | 6/2012 | Speckhart et al. | |
| 2013/0154325 A1 | 6/2013 | Carlin et al. | |
| 2013/0257126 A1 | 10/2013 | Freisleben et al. | |
| 2015/0308885 A1 | 10/2015 | Griffin et al. | |
| 2016/0288668 A1 | 10/2016 | Cortney et al. | |
| 2019/0003877 A1* | 1/2019 | Aina ...................... | B60N 2/002 |
| 2019/0100117 A1* | 4/2019 | Vanfossen .............. | B60N 2/002 |

FOREIGN PATENT DOCUMENTS

| | | | | |
|---|---|---|---|---|
| CA | 2348639 A1 * | 3/2000 | ....... | B60R 21/01516 |
| KR | 20130139584 | 12/2013 | | |

OTHER PUBLICATIONS

Search and Examination Report, GB1712328.2, dated Jan. 26, 2018, 5 pages.

* cited by examiner

*Primary Examiner* — Anthony D Barfield
(74) *Attorney, Agent, or Firm* — Miller Nash Graham & Dunn LLP (57) ABSTRACT

Provided is a vehicle seat for use with an occupant classification system (OCS). The seat comprises: a seat base including a seat base support, and a cushion pan mounted on the seat base support and forwardly moveable on the support to extend the seat base. The seat further comprises an intermediate layer fixed with respect to the seat base support and adapted for fastening to a component of the OCS so that when the seat base is extended by the cushion pan moving forward with respect to the seat base support, the intermediate layer does not move forward with the cushion pan but remains substantially stationary. The relationship between the various OCS components can therefore be maintained irrespective of the extension of the seat base.

20 Claims, 8 Drawing Sheets

VEHICLE SEAT

CROSS REFERENCE TO RELATED APPLICATION

This application claims priority to and the benefit of GB1712328.2, filed Aug. 1, 2017, the content of which is incorporated by reference herein in its entirety.

TECHNICAL FIELD

The present disclosure relates to a vehicle seat and particularly, but not exclusively, to a vehicle seat having an extendable seat base for use with an occupant classification system. Aspects of the invention relate to a vehicle seat, to a method for controlling a vehicle seat, and to a vehicle incorporating one or more such seats.

BACKGROUND

Two of the major functions of the seats found in vehicles are to provide for the comfort and the safety of the occupants. Modern vehicle seats are often adjustable. In particular, the forward most edge of the cushioned seat base on which the occupant sits is frequently configured to extend outwards relative to the backrest of the seat, for example to improve comfort for occupants with longer legs. While some adjustable seats of this kind comprise a secondary cushion cassette which moves to extend the seat edge while the main seat base cushion remains stationary, other versions involve the forward movement of the entire cushion of the seat base along with the underlying seat structure.

Vehicle seats are also commonly fitted with occupant classification systems (OCS). These systems detect the presence of a passenger, and can determine their approximate weight and seating position. A primary function of these systems is to control the deployment of airbag systems. As rapid airbag deployment can be dangerous to occupants, particularly children, infants and smaller adults; and those positioned closer to the airbag, the weight and position data collected by the OCS can be used to reduce the speed of airbag deployment or disable it entirely. In the United States, advanced airbag systems which use this kind of technology are mandated by law.

A typical OCS installed in the seat base comprises a "bladder" filled with a flowable material, such as a liquid or gel, and connected by a hose to a transducer. The transducer is typically a pressure sensor. The bladder may be in the form of a tubing arrangement or a mat, or a combination thereof. The pressure sensor communicates with an electronic control unit, so that when someone sits on the seat where the OCS is installed, the material in the bladder is displaced and is registered by the pressure sensor which in turn sends a signal to the control unit that the seat is occupied. By means of one or more sensors, it is possible also to ascertain the occupant's weight and/or position on the seat which information may also be conveyed to the control unit. The control unit then transmits data to the associated airbag which will also have its own electronic control unit.

The components comprising the OCS are commonly supplied by a third party, making it frequently impractical to adapt these components to the particular configuration of the seat to which they are fitted. For safety and operational reasons, strict guidelines regulate the relationships both between the components of the OCS, and between those components and the components of the seat. For instance, it is vital that the hose between the bladder and the pressure sensor is not constricted. Suppliers of OCS may stipulate that the hose is routed such that it does not interfere, foul or become entangled with any other seat component during movement of the seat when the seat is occupied.

It is therefore an object of at least certain embodiments of the invention to provide an adjustable vehicle seat suitable for use with an OCS which allows for the forward movement of the seat base cushion without compromising the operability of the OCS.

SUMMARY

Aspects and embodiments of the invention provide a seat for use with an occupant classification system (OCS) within a vehicle, a method for controlling a vehicle seat and a vehicle comprising one or more such seats as claimed in the appended claims.

According to one aspect of the invention, there is provided a vehicle seat for use with an OCS, the seat comprising a seat base including a seat base support and a cushion pan mounted on the seat base support and forwardly moveable on the support to extend the seat base, wherein the seat further comprises an intermediate layer fixed with respect to the seat base support and adapted for fastening to a component of the OCS, such that when the seat base is extended by the cushion pan moving forward with respect to the seat base support, the intermediate layer does not move forward with the cushion pan but remains substantially stationary.

According to another aspect of the invention, there is provided a vehicle seat for use with an occupant classification system, OCS, within a vehicle, the seat comprising a seat base including a seat base support a cushion pan mounted on the seat base support and moveable to extend the seat base wherein the seat further comprises an intermediate layer for fastening to at least one component of the OCS and said layer is fixed with respect to the seat base support, such that when the seat base is extended by the cushion pan moving with respect to the seat base support, the intermediate layer does not move with the cushion pan but remains substantially stationary wherein the OCS is of the type comprising a bladder with an outlet connected to a pressure sensor via a hose and the intermediate layer is for fastening to the pressure sensor wherein the intermediate layer is provided with an opening for permitting one end of the hose to pass for connecting with the outlet from the bladder In some embodiments, the OCS may be of the type comprising a bladder with an outlet connected to a pressure sensor via a hose and the intermediate layer is adapted for fastening to the pressure sensor.

By means of the invention, when an OCS is installed on the vehicle seat, a component thereof may be fastened to the intermediate layer which is held in a substantially fixed position on the seat irrespective of whether or not the seat base is in an extended formation. Thus the positional relationship between various components of the OCS, for example between the bladder outlet, hose and the transducer/pressure sensor can be maintained. In this way, the possibility for the OCS component(s), such as the pressure sensor and/or hose, to collide with an actuator, such as a fore and aft motor, positioned on the underside of the seat base, or indeed any other seat components in the vicinity, may be avoided.

The OCS component fastened to the intermediate layer may be the transducer, optionally in the form of a pressure sensor. For certain systems, the OCS supplier requires that the pressure sensor be maintained at a position lower than the bladder outlet when installed on the vehicle seat. Accordingly, the intermediate layer is typically disposed between the cushion pan and the pressure sensor. In an embodiment, the intermediate layer is provided with fastening means for the pressure sensor on the underside of the layer thereby enabling the pressure sensor to be fixed to the underside of the mat.

In use, the OCS is installed on the seat with the bladder overlying the intermediate layer (and typically under a foam cushion) where it is subject to pressure when the seat is occupied. Optionally, the intermediate layer has an overall length and width to substantially cover the underside of the bladder, thereby additionally acting to protect the underside of the bladder from frictional contact with seat components, such as may occur during forward or rearward movement of the seat or when the seat base is extended or retracted.

In an embodiment, the OCS is installed such that the hose connecting the bladder outlet to the pressure sensor resides below the intermediate layer. Accordingly, the intermediate layer may be provided with an opening through which one end of the hose can pass for connecting with the outlet from the bladder. The opening may be in the form of an elongate slot, for example extending from the forward or leading edge of the intermediate layer at least as far as where the outlet of the bladder resides when installed on the seat.

Most vehicle seats include a suspension system. In the vehicle seat according to the present invention, a suspension system is optionally provided which is attached to the seat base. The suspension system is optionally in the form of a suspension mat which moves by stretching as the cushion pan is moved forwards, thereby ensuring that the seat cushion remains supported when the seat base is extended.

The suspension mat may comprise one or more suspension springs for supporting a seat cushion. Such springs may be made of steel wire or the like, and are flexibly linked to each other by cross-ties. The springs are retained taut on the seat base between a plurality of fixation sites. In an embodiment, the springs are secured at their rear end to the seat base support and at their front or forward end to the moveable cushion pan. In this way, as the cushion pan is moved forward to extend the seat base, the springs attached thereto are stretched.

Optionally, the suspension system also supports the bladder or mat of the OCS when the OCS is fitted to the seat. In one embodiment, a suspension mat is attached to the seat base such that it lies underneath the intermediate layer, for example, so that the intermediate layer rests on the suspension mat. In this arrangement, the intermediate layer is effectively sandwiched between the OCS bladder and the suspension mat. When the suspension mat comprises suspension springs, such as S-shaped springs, these may be arranged such that they do not interfere with the pressure sensor mounted on the underside of the intermediate layer. Optionally, the springs will surround the sides of pressure sensor yet remain spaced therefrom whether in fully extended or retracted mode or in an intermediate position. Thus, when the cushion pan is moved forward to extend the seat base, the suspension mat stretches and slides over the underside of the intermediate layer which itself remains stationary. Accordingly, when fitted with an OCS, by virtue of the pressure sensor being affixed to the intermediate layer rather than to the suspension mat, the pressure sensor and hence the outlet of the hose (which is connected to the pressure sensor) are held in substantially the same relationship throughout, irrespective of the extent to which the seat base is extended. Moreover, the presence of the intermediate layer prevents chafing on the underside of the OCS bladder which might otherwise occur as the springs expand and contract during movement of the cushion pan.

To reduce friction with the suspension system, the intermediate layer may comprise a smooth, hard wearing material, such as a flexible sheet, optionally a Nylon sheet, or from another fabric having a non-stick coating applied thereto.

In an embodiment, the seat base support includes a rear support member, such as a crossbar, to which the intermediate layer may be anchored to fix the position of the intermediate layer on the seat. The intermediate layer may be fixed directly to the rear support member or indirectly via the suspension system. For example, the suspension system may comprise a suspension mat provided with a rear fixing element, such as a strip having a plurality of hooks which clip on to or over the rear support member, and the rear fixing element may be provided with one or more fixing points where the rear of the intermediate layer may be attached thereto.

As will be understood, when the intermediate layer is affixed to the rear support and with the pressure sensor being affixed to the intermediate layer, the distance between the pressure sensor and the rear support remains constant. This distance, or separation, is maintained when the seat height is raised or lowered as well as when the seat base is extended or contracted.

In addition to providing the fixing location for the pressure sensor, the intermediate layer may also provide a fixing location for a guard for protecting the pressure sensor, for example a foot guard for protecting the pressure sensor from the rear.

According to another aspect of the invention, there is provided a method for controlling a seat, said method comprising providing a vehicle seat for use with an occupant classification system (OCS), said seat comprising a seat base including a seat base support and a cushion pan mounted on the seat base support and moveable to extend the seat base, wherein the method further comprises providing the seat base with an intermediate layer adapted to fasten with a component of the OCS, such as the transducer or pressure sensor, and fixed with respect to the seat base support, whereby when the seat base is extended by moving the cushion pan with respect to the seat base support, the intermediate layer does not move with the cushion pan but remains substantially stationary.

According to yet another aspect of the invention, there is provided a vehicle comprising one or more vehicle seats in accordance with the above aspect of the invention.

For the avoidance of doubt, the seat elements have been described with reference to their usual relative position within the vehicle. The terms "front", "back" and "rear" used herein are to be given their usual meaning in relation to a vehicle. Furthermore, the term "forward" (and derivatives thereof) has been used to describe a movement from the rear of the vehicle towards the front of the vehicle. Conversely, the terms "backward" and "rearward" (and derivatives thereof) have been used to describe a movement from the front of the vehicle towards the rear of the vehicle. Likewise, the terms "up", "above", and "over" refer to directions away from the vehicle floor and towards the seat occupant, while "down", "below", and "under" refer to directions away from the occupant and towards the vehicle floor. In the event of non-standard vehicle layout (for example, rear-facing seats), these directions are intended to vary accordingly.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION OF THE EMBODIMENTS

Figure 1:
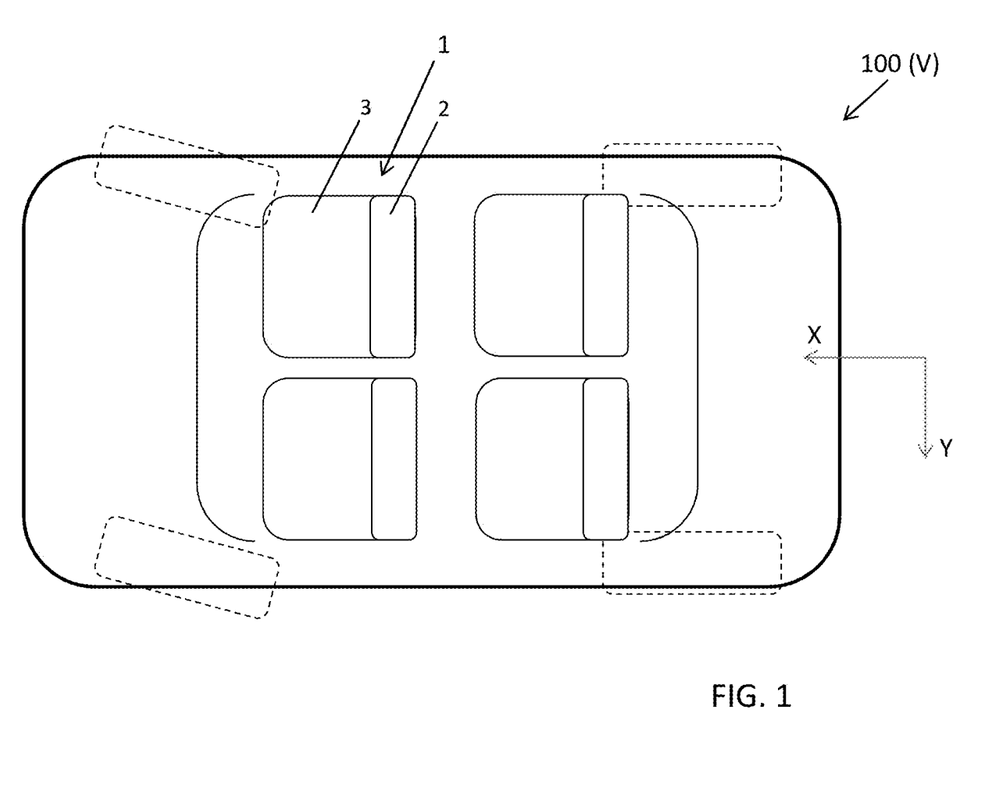
FIG. 1 shows a vehicle comprising one or more of the seats according to an embodiment of the invention.

A vehicle 100 (also labelled as V) incorporating a vehicle seat assembly 1 in accordance with an embodiment of the present invention is schematically shown in FIG. 1. The vehicle V in the illustrated arrangement is an automobile, but the vehicle seat assembly 1 could be used in other types of vehicle V. In the illustrated arrangement, the vehicle seat assembly 1 is the front right hand seat in the vehicle V, but the assembly could equally be installed on the left hand seat, or on both right and left hand seats. The vehicle V has a reference frame comprising a longitudinal axis X, a transverse axis Y and a vertical axis Z in a direction perpendicular to the page.

Figures 2A, 2B:
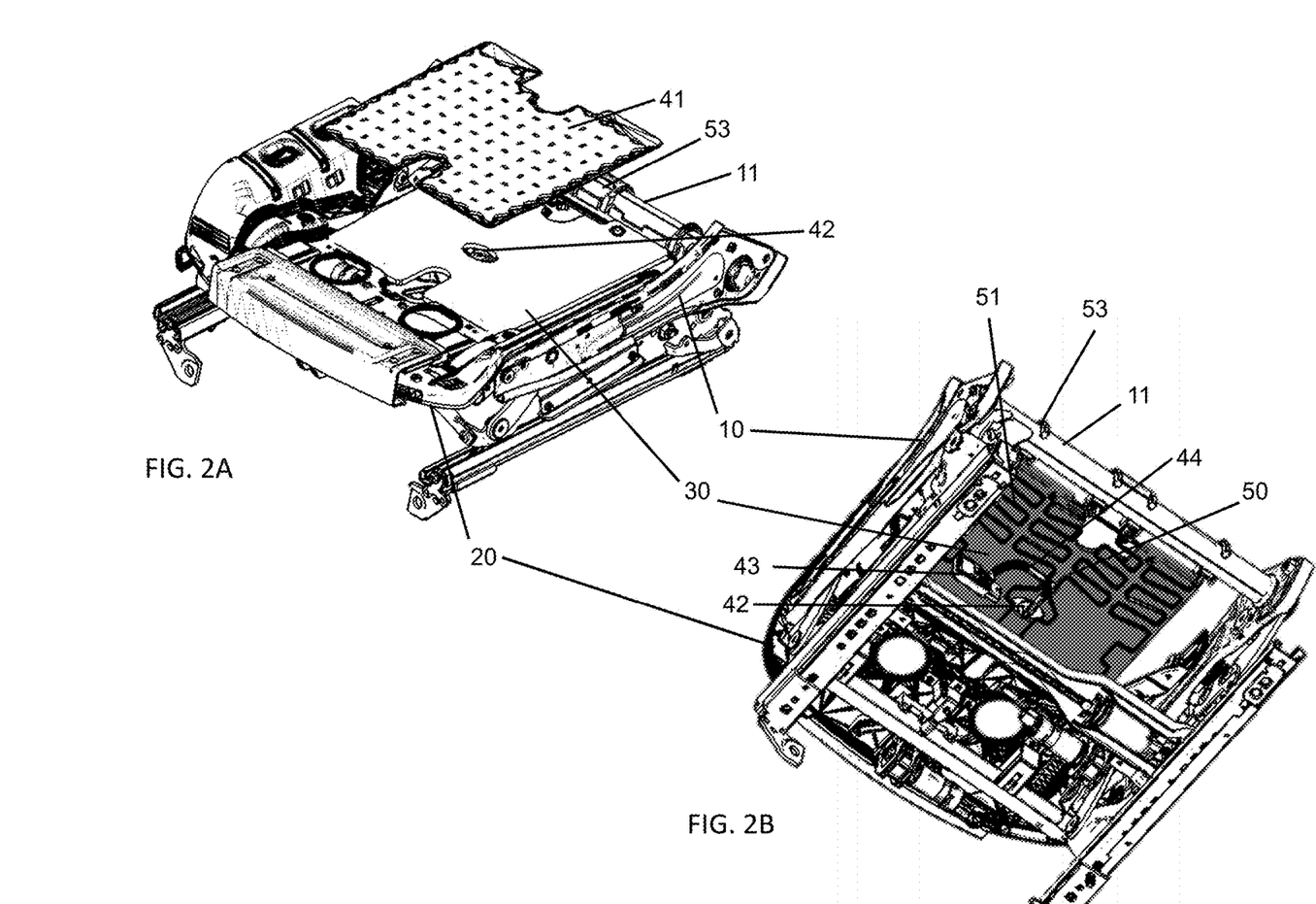
FIGS. 2A and 2B show a perspective view of the vehicle seat from above (2A) and below (2B) according to an embodiment of the invention.
Figure 3:
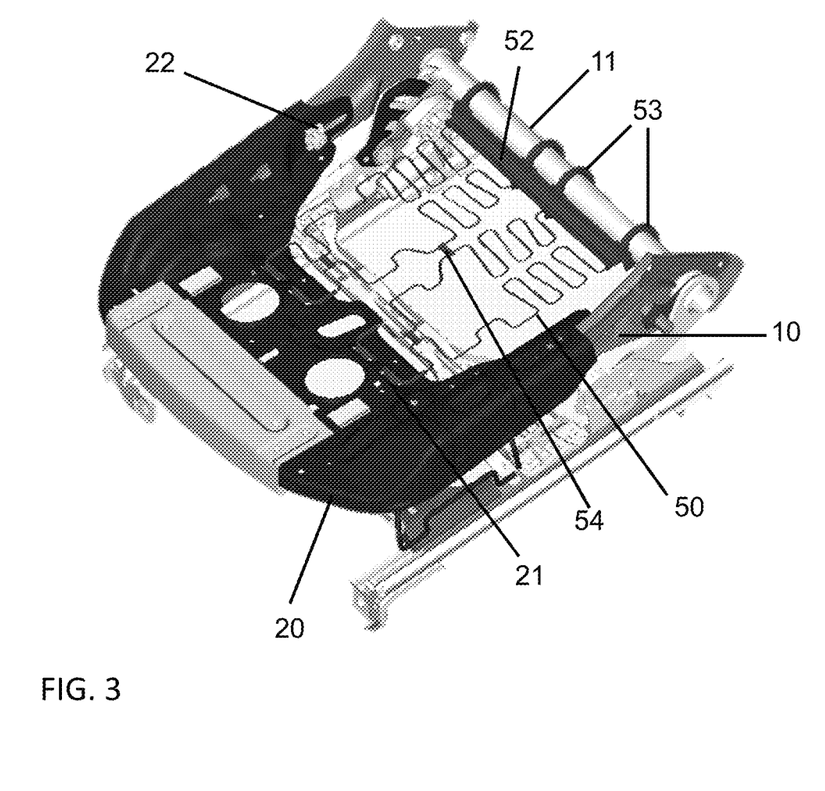
FIG. 3 shows a perspective view from above of some components of the vehicle seat according to an embodiment of the invention in (fully) retracted position.

As shown in FIGS. 2A and 2B, the vehicle seat comprises a seat base support 10, and a cushion pan 20 mounted on the seat base support 10 and forwardly moveable on the seat base support 10, and has an intermediate layer 30 fixed with respect to the seat base support 10. The seat is for use with an occupant classification system (OCS) which is shown, and in this embodiment has a bladder 41 (here shown detached for ease of visualisation of the other components) with an outlet 42, and a pressure sensor 43, connected via a hose 44. The pressure sensor 43 is fastened to the underside of the intermediate layer 30. A suspension system 50 comprising a plurality of S-shaped springs 51 is connected on the forward most side to the cushion pan 20 and on the rearmost side it includes a rear fixing element 52 (FIG. 3) in the form of a strip having a plurality of hooks 53 which clip onto or over the crossbar rear support member 11 of the seat base support 10.

The seat base support 10 acts as an anchor for the other components during extension and retraction of the seat base. The seat base support includes a rear support member 11, in the form of a crossbar, to which the other components are attached. The seat base 10 support is fixed to the backrest portion of the vehicle seat and to the floor of the vehicle.

The cushion pan 20 provides a base for an overlying cushion (not shown) to be located on top of the vehicle seat. It also provides connections 21 for the attachment of the suspension system 50. The cushion pan 20 is itself connected to the seat base support 10. When the seat is extended, the cushion base moves along the seat base support towards the front end of the vehicle. For extension to occur, connection with the seat base support 10 must enable this movement and in the illustrated embodiment a pin-and-slot mechanism 22 has been used. FIGS. 4A-D show the seat with and without the bladder 41 of the OCS and in both fully retracted (A, B) and fully extended (C, D) configurations. The connection 22 between the cushion pan 20 and seat base support 10 is shown to allow this extension.

It will be understood that extension may occur through any means contemplated, such as by electrical motor action or manual input via levers, rotating knobs or elastic release. For example, an actuator may be used to provide the force to move the cushion pan 20 forwards, while elastic force stored by the suspension system 50 may be used to return the seat to the retracted position. Means may be included to lock the seat in extended, retracted or intermediate positions. For example the actuator may be held at a particular extension length.

Figure 4A:
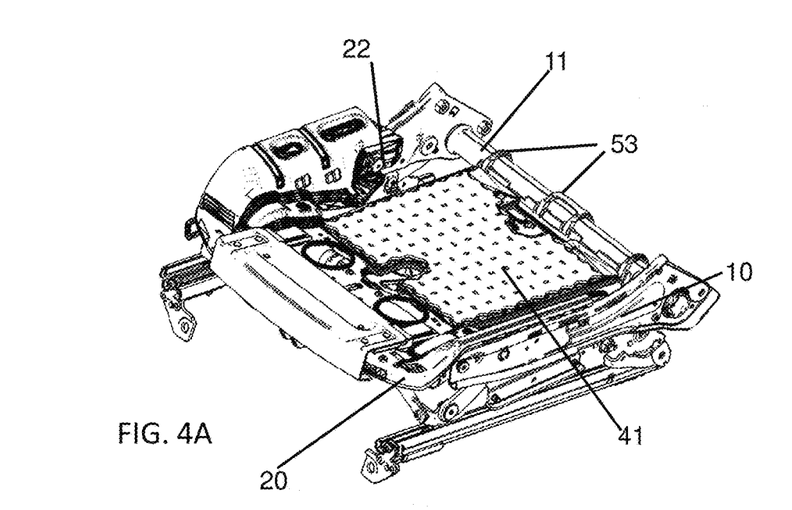
FIG. 4A shows a perspective view from above of the vehicle seat according to an embodiment of the invention in (fully) retracted position.
Figure 4B:
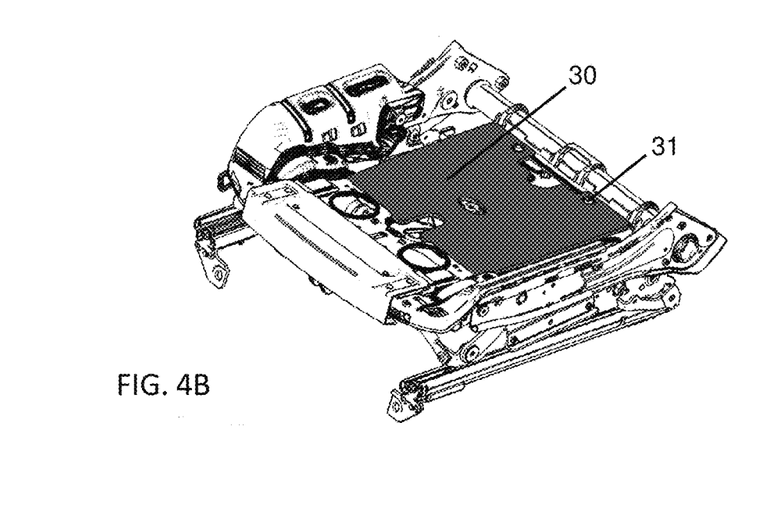
FIG. 4B shows a perspective view from above of the vehicle seat, without an OCS bladder, according to an embodiment of the invention in (fully) retracted position.
Figure 4C:
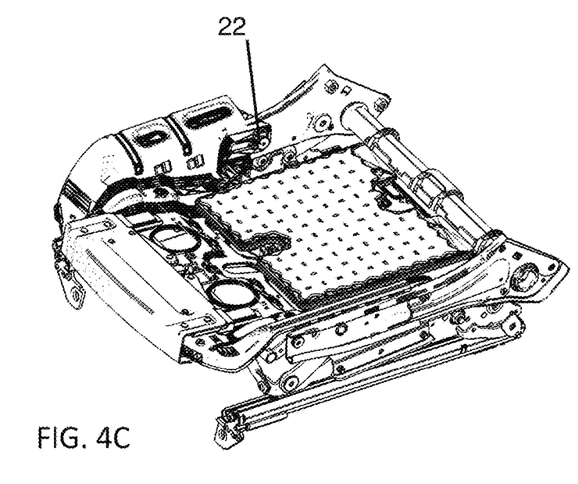
FIG. 4C shows a perspective view from above of the vehicle seat according to an embodiment of the invention in (fully) extended position.
Figure 4D:
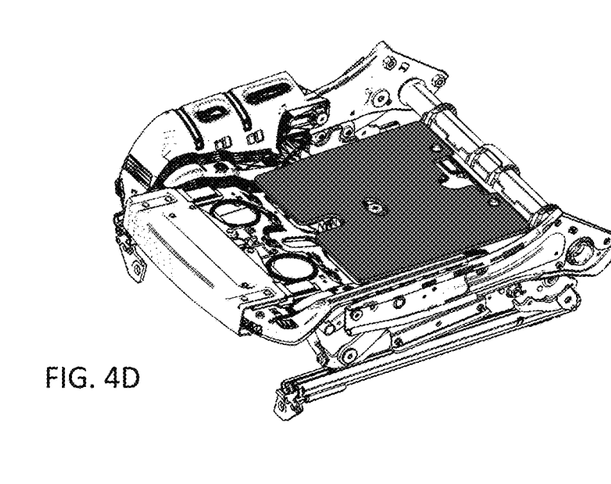
FIG. 4D shows a perspective view from above of the vehicle seat, without an OCS bladder, according to an embodiment of the invention in (fully) extended position.

The intermediate layer 30, which may also be referred to as a 'slip mat', is fixed 31 to the rear fixing element 52 of the suspension system 50 and so to the seat base support 10, but is not fixed to the cushion pan 20, so that when the seat base is extended by the cushion pan 20 moving forward with respect to the seat base support 10, the intermediate layer 30 does not move forward with the cushion pan 20 but remains substantially stationary, as shown in FIGS. 4B and 4D. The intermediate layer 30 may be made from a nylon sheet or from another similar fabric, and may have a non-stick coating applied thereto.

Figure 5:
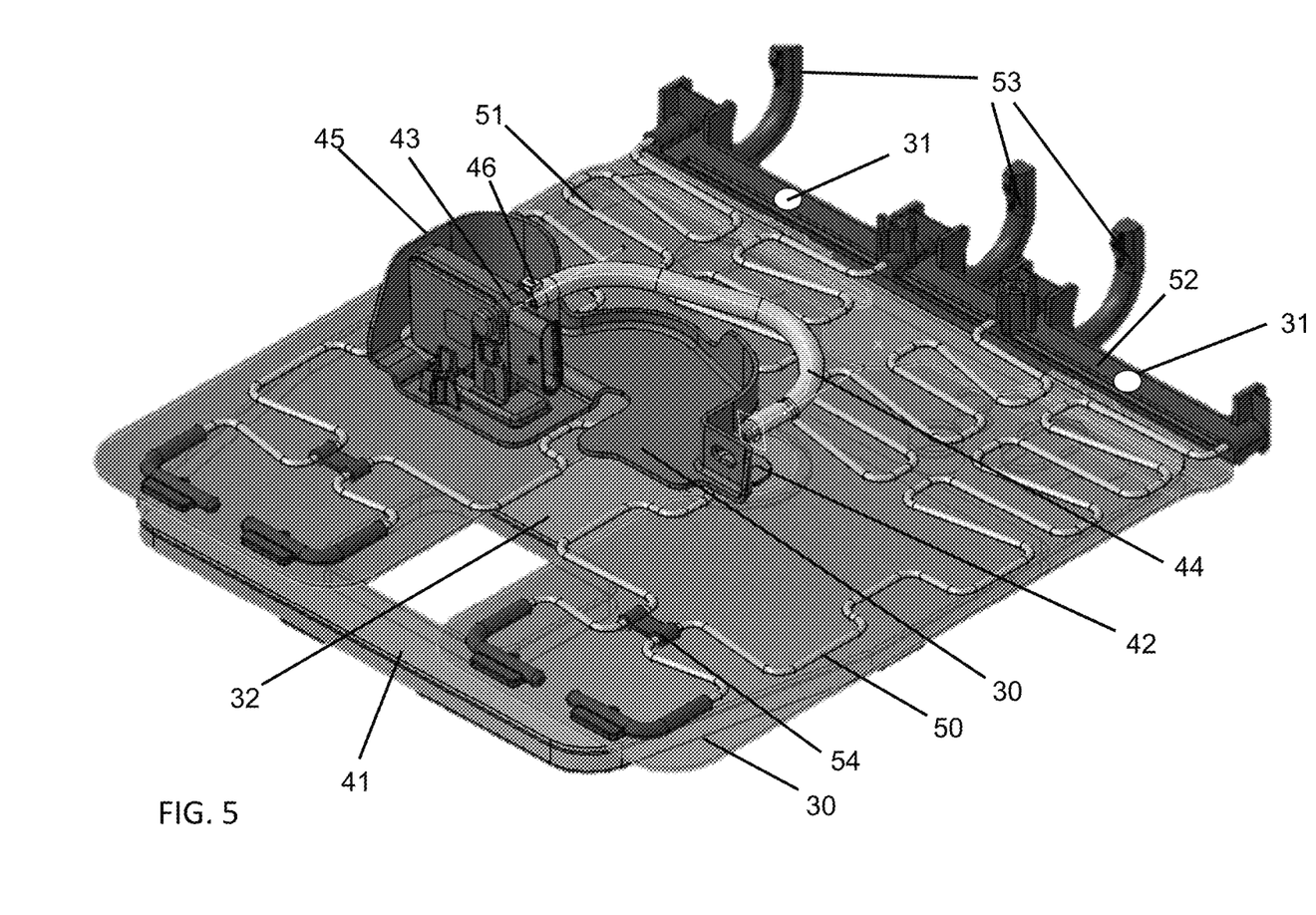
FIG. 5 shows a perspective view from below of part of the vehicle seat according to an embodiment of the invention.
Figure 6:
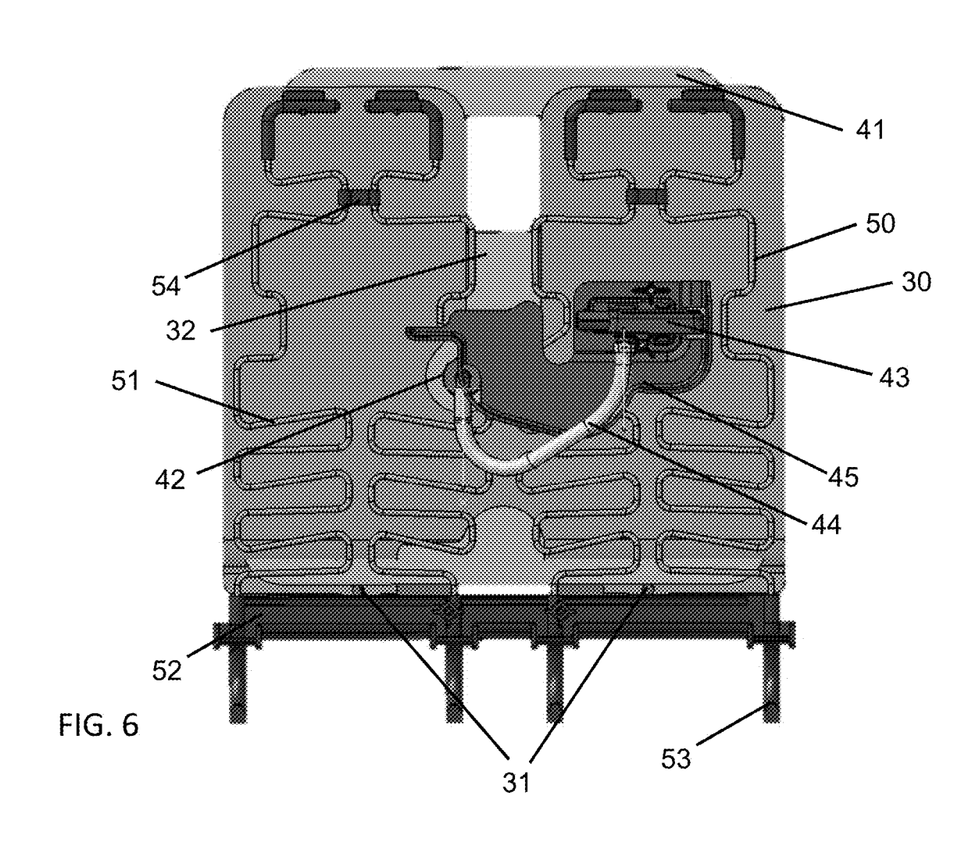
FIG. 6 shows part of the vehicle seat from below according to an embodiment of the invention.

The intermediate layer 30 is equipped with an opening 32 corresponding to the bladder outlet 42 on the OCS bladder 41, to allow the OCS hose 44 to connect with the outlet 42. FIGS. 5 and 6 show the opening 32 in the form of an elongated slot which connects with the outer edge of the intermediate layer 30. This aids in construction, as it allows the intermediate layer 30 to be inserted around components already present, or for the OCS components to be slotted into place if the intermediate layer is already installed. The opening 32 in the intermediate layer 30, and/or the gaps between the S-springs 51 of the suspension system 50, allows the hose 44 and pressure sensor 43 to be positioned on the opposite side of the intermediate layer 30 to the OCS bladder 41, with the pressure sensor 43 still being attached to the intermediate layer 30.

To further reduce movement or abrasion of the bladder 41 and other components upon seat extension, the intermediate layer 30 has a length and width sufficient for it to be able to cover all or most of the members which make up the suspension system 50. As a result, the suspension system 50 is effectively separated from the OCS bladder 41, and drag caused by the extending movement is not transferred. In this way the underside of the bladder 41 is protected from friction with other seat components.

A suspension system 50 is provided in the vehicle seat. This system 50 is attached to the seat base 10 and moves with the cushion pan 20 during extension. As shown in FIGS. 5 and 6, the suspension system 50 is located underneath the intermediate layer 30, so that the intermediate layer 30 rests on the suspension system 50. The suspension system 50 is further attached to the cushion pan 20 and is elastic so that it stretches during seat extension. In this way it maintains its connection both to the rear support 11 and the moving cushion pan 20. The elasticity also improves the ability of the suspension system 50 to provide in-seat suspension for vibration dampening and minor shock absorption. The suspension system 50 comprises a plurality of S-shaped springs 51, having an overall sinuous, undulating or serpentine shape, with these S-springs 51 oriented to form a substantially horizontal layer.

The forward most ends of the S-springs 51 are attached 21 to the cushion pan of the seat while the rearmost ends of the S-springs 50 are attached to the rear support 11. The springs are flexibly linked to each other by cross-ties 54 to allow for limited independent movement. As shown, the use of S-springs 51 for the suspension system 50 allows for an arrangement which leaves spaces between which other components can protrude, such as the OCS hose 44, bladder outlet 42 and pressure sensor 43, and this also gives such components clearance of movement when the suspension system 50 extends, since these components do not move at the same time.

The suspension system 50 is anchored to the seat base support 10 through a rear fixing element 52 which is in the form of a strip having a plurality of hooks 53 which clip to the crossbar of the rear support 11 of the vehicle seat. The ends of the S-spring members 51 of the suspension system 50 are attached to the structure of the rear fixing element 52. The rear fixing element 52 also provides points 31 at which the intermediate layer 30 is attached, and also provides attachment points for the OCS bladder 41 to be attached when fitted. On extension and retraction of the seat assembly, the rear fixing element 52 maintains its position relative to the crossbar 11.

The OCS bladder 41 and pressure sensor 43 may be of the type supplied under the name Delphi™ Passive Occupant Detection Systems. An example of this variety of OCS includes a bladder 41 with an outlet 42, to which is attached a hose 44 which contains fluid or gel, which also connects to a pressure sensor 43. The bladder 41 is a fluid or gel-filled elastomeric bladder which communicates through the outlet 42 with the hose which connects to the pressure sensor 43. The fluid used is incompressible, non-corrosive, and not subject to breaking down or freezing at the extremes of vehicle operating temperatures and can be silicone. The OCS bladder 41 is also attached to the rear support 11 via the rear fixing element 52 of the suspension system, to improve its ability to maintain its position during seat base extension.

The action of weight on the bladder 41, such as by an occupant sitting on the seat, increases the pressure of the contents of the hose 44, with a greater weight causing a greater increase in pressure. The pressure sensor 43, connected to the hose 44 via the pressure sensor inlet 46, acts to detect the increase in pressure, which relates to the weight of the occupant of the seat. Due to this function, it is necessary for the pressure sensor inlet 46 to be maintained lower than the OCS bladder outlet 42. The pressure sensor 43 and hose 44 are protected by a foot guard 45 (FIGS. 5 and 6) against collisions with seat components or other objects. The intermediate layer 30 also provides a fixing location for the foot guard 45.

The pressure sensor 43 communicates data relating to the weight placed on the seat to a controller (not shown) which may communicate with the airbag system of the vehicle to determine whether and how rapidly to deploy airbags in the event of a collision. The controller can also receive information on other variables which may complement the data gathered by the OCS, such as the seat orientation, extension state, and backrest angle, such that it can compensate for any effects these might have.

Figure 7:
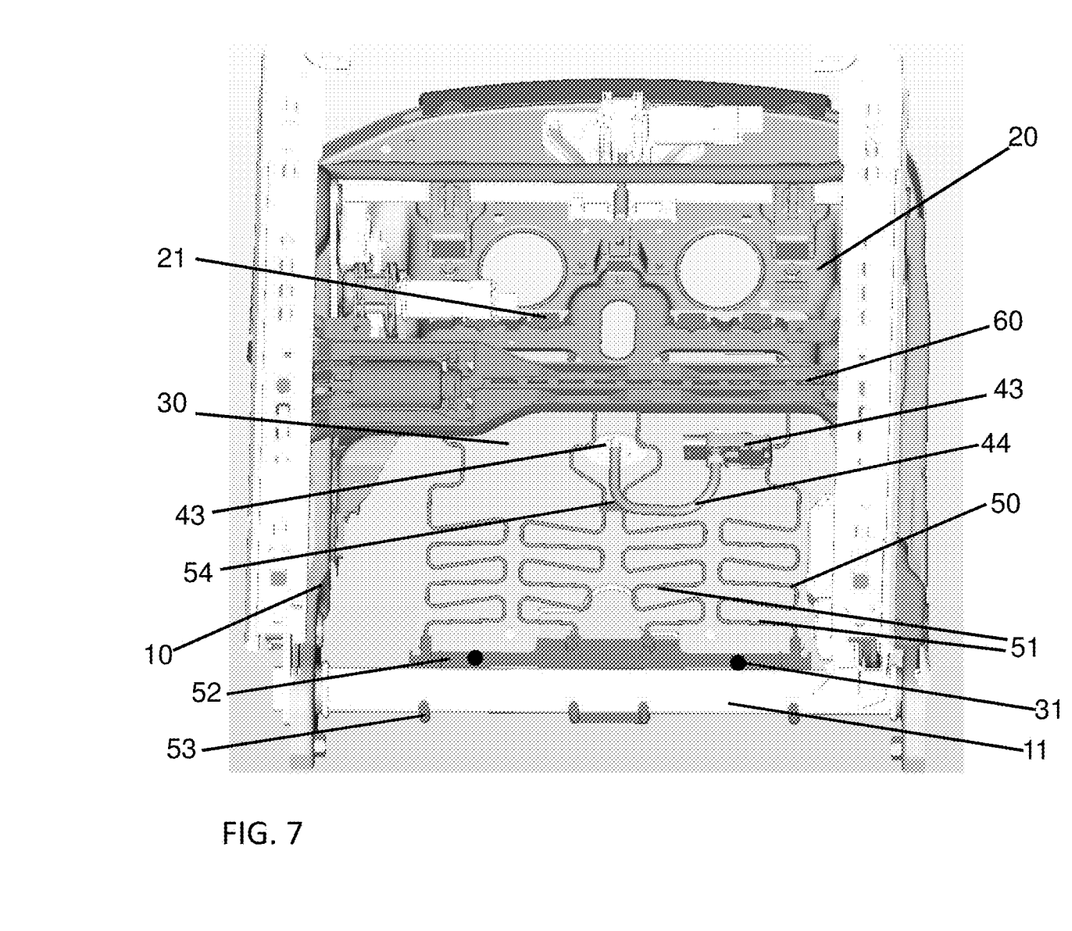
FIG. 7 shows a plan view from below of part of the vehicle seat according to an embodiment of the invention to show the relationship between the components of the invention and other components which may be present.

It will be appreciated that if the pressure sensor 43 were to be attached to the suspension system 50 rather than to the intermediate layer 30, the extension of the suspension system 50 would move the pressure sensor 43 relative to the OCS bladder 41, with corresponding effects on the connecting hose 44. This could lead to damage or contortion of the hose 44, or to failure to maintain the pressure sensor 43 below the OCS bladder outlet 42, either of which could compromise OCS function by affecting pressure transfer within the hose 44. In an embodiment, shown in FIG. 7, an actuator 60, which can be a fore and aft motor, is present on the underside of the seat base. In this embodiment, movement of the pressure sensor 43 could lead to collision between it and the actuator. These occurrences would be contrary to regulations for use of OCS systems, under which the pressure sensor must have full clearance with internal seat components in all seat positions.

Figure 8:
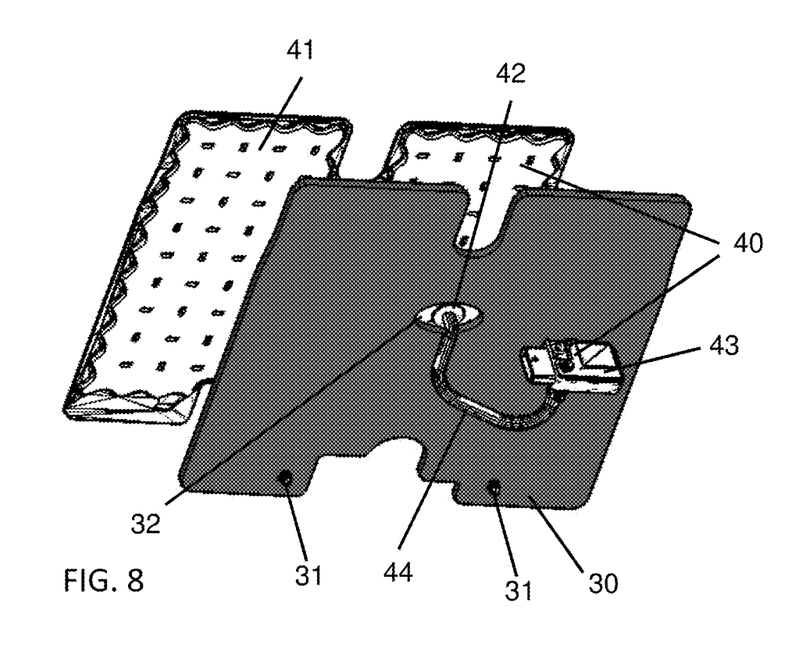
FIG. 8 shows an 'exploded' diagram of various components of the OCS with the intermediate layer according to an embodiment of the invention.

However, in accordance with the present invention, the pressure sensor 43 is attached to the intermediate layer 30 which is located between the OCS bladder 41 and the suspension system 50, as shown in FIG. 8, which shows the configuration of the OCS 40 and intermediate layer 30. The intermediate layer 30 is connected to the seat base support 10 by attachment 31 to the rear fixing element 52 of the suspension system 50, such that when seat extension occurs both intermediate layer 30 and pressure sensor 43 maintain their position relative to the rear support 52 and to the OCS bladder 41 as shown in FIGS. 4A and 4C. In this way permitted OCS function is maintained during extension.

A further advantage of the invention is that no or minimal modifications need to be made to the OCS components to allow them to be used in such a seat. As such, the seat provided is compatible for use with multiple existing OCS products.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible herewith. All the features disclosed in the specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Modifications may be made to the illustrated embodiments without departing from the scope of the present invention as defined in the accompanying claims.

The invention claimed is:

1. A seat for use with an occupant classification system (OCS) within a vehicle, the seat comprising:
   a seat base including a seat base support; and
   a cushion pan mounted on the seat base support and moveable to extend the seat base;
   wherein the seat further comprises an intermediate layer for fastening to at least one component of the OCS and said layer is fixed with respect to the seat base support, such that when the seat base is extended by the cushion pan moving with respect to the seat base support, the intermediate layer does not move with the cushion pan but remains substantially stationary;
   wherein the OCS is of the type comprising a bladder with an outlet connected to a pressure sensor via a hose and the intermediate layer is for fastening to the pressure sensor; and
   wherein the intermediate layer is provided with an opening for permitting one end of the hose to pass for connecting with the outlet from the bladder.

2. The seat according to claim 1, wherein the underside of the intermediate layer is provided with fastening means, thereby enabling the OCS component to be fixed to the underside of the intermediate layer.

3. The seat according to claim 1, wherein the intermediate layer has an overall length and width to substantially cover the underside of the bladder, for protecting the underside of the bladder from frictional contact with seat components, such as may occur during forward or rearward movement of the seat or when the seat base is extended or retracted.

4. The seat according to claim 1, wherein the opening is in the form of an elongate slot.

5. The seat according to claim 1 when fitted with an OCS which is installed such that the hose connecting the bladder outlet to the pressure sensor resides below the intermediate layer.

6. The seat according to claim 1, wherein the intermediate layer comprises a smooth, hard wearing flexible sheet.

7. The seat according to claim 6, wherein the flexible sheet is a nylon sheet.

8. The seat according to claim 1, wherein the seat base support includes a rear support member, to which the intermediate layer is anchored directly or indirectly to fix the position of the intermediate layer in relation to the seat base support.

9. The seat according to claim 8, wherein the rear support member is a crossbar.

10. The seat according to claim 1, further comprising a suspension system which is attached to the seat base.

11. The seat according to claim 10, wherein the suspension system comprises a suspension mat which stretches as the cushion pan is moved forwards to extend the seat base.

12. The seat according to claim 11, wherein the suspension mat comprises one or more suspension springs for supporting a seat cushion.

13. The seat according to claim 12, wherein the suspension springs are secured at their rear end to the seat base support and at their front or forward end to the moveable cushion pan, such that as the cushion pan is moved forward to extend the seat base, the springs attached thereto are stretched.

14. The seat according to claim 12, wherein the suspension springs are arranged so that they do not interfere with the pressure sensor, when the sensor is mounted on the underside of the intermediate layer.

15. The seat according to claim 14, wherein the springs surround the sides of pressure sensor yet remain spaced therefrom when the seat is fully extended, fully retracted or in an intermediate position.

16. The seat according to claim 10, wherein the suspension system supports the bladder of the OCS when the OCS is fitted to the seat.

17. The seat according to any of claim 11, wherein the suspension mat is attached to the seat base such that it lies underneath the intermediate layer, so that the intermediate layer rests on the suspension mat.

18. The seat according to any of claim 11, wherein the suspension mat is provided with a rear fixing element for fixing to the seat base support.

19. The seat according to claim 1, wherein the intermediate layer further comprises a fixing location for a guard for protecting the pressure sensor.

20. A vehicle comprising the seat according to claim 1.

* * * * *